(12) United States Patent
Kawasaki et al.

(10) Patent No.: US 6,348,007 B2
(45) Date of Patent: *Feb. 19, 2002

(54) GOLF CART LOCATION DISPLAY DEVICE

(75) Inventors: Hiroaki Kawasaki; Nobuo Akiba; Hiroshi Yoshino, all of Mobara (JP)

(73) Assignee: Futaba Denshi Kogyo Kabushiki Kaisha, Mobara (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,068

(22) Filed: May 13, 1999

(30) Foreign Application Priority Data

| | | |
|---|---|---|
| May 14, 1998 | (JP) | 10-132316 |
| Feb. 26, 1999 | (JP) | 11-051165 |

(51) Int. Cl.$^7$ ............................................ A63B 57/00
(52) U.S. Cl. ....................................... 473/131; 473/140
(58) Field of Search ........................... 700/92; 340/988, 340/571–2, 539, 990, 825.69, 825.72, 932.2; 473/131, 140, 198, 407, 406; 364/400, 410.1; 455/5.1, 9, 6.1, 6.3, 404, 412, 95, 230

(56) References Cited

U.S. PATENT DOCUMENTS

| | | | | |
|---|---|---|---|---|
| 4,926,161 A | * | 5/1990 | Cupp | 340/988 |
| 5,095,430 A | * | 3/1992 | Bonito et al. | 700/92 |
| 5,324,028 A | * | 6/1994 | Luna | 473/169 |
| 5,610,586 A | * | 3/1997 | Zeytoonjian et al. | 340/571 |
| 5,664,880 A | * | 9/1997 | Johnson et al. | 473/407 |
| 5,719,555 A | * | 2/1998 | Zeytoonjian et al. | 340/571 |
| 5,797,809 A | * | 8/1998 | Hyuga | 473/407 |

OTHER PUBLICATIONS

Microsoft Excel for Window, Version 5.0, User's Guide vol. 1, 1993.*

* cited by examiner

*Primary Examiner*—Jessica J. Harrison
*Assistant Examiner*—Kim T. Nguyen
(74) *Attorney, Agent, or Firm*—Oblon, Spivak, McClelland, Maier & Neustadt, P.C.

(57) ABSTRACT

A golf cart control and monitoring system on a golf course including a plurality of sensors arranged along a golf cart path at locations corresponding to at least a teeing ground, a fairway, and a putting green of each hole of the golf course in which each of the sensors includes a sensor ID transmitting apparatus. Each of a plurality of golf carts traveling on the golf cart path includes a golf cart ID transmitting apparatus configured to maintain communication between the sensors and the golf carts. Also included is a golf cart control station having a golf cart location device configured to determine locations of the golf carts traveling on the golf cart path. The golf cart location device includes a radio transmitter/receiver configured to receive information on the golf cart IDs and a current location of the golf carts in the golf course from the sensors and the golf carts. The location device also includes a signal processing unit configured to process information on the golf cart IDs and the current location of the golf carts and to provide a table including location information corresponding to the current location of each golf cart on the teeing ground, the fairway and the putting green of each hole of the entire gold course. The location information is displayed in a sequentially straight line or a bar graph. A display indicates a progress of the golf carts on the table as the golf carts travel around the golf course.

7 Claims, 15 Drawing Sheets

FIG.4

PLAY PROGRESS STATUS TABLE

FIG.5

PLAY TIME SETTING

| HOLE | SAKURA COURSE (OUT) | | SAKURA COURSE (IN) | | MATSU COURSE (OUT) | | MATSU COURSE (IN) | |
|---|---|---|---|---|---|---|---|---|
| | PLAYABLE GROUPS IN NUMBER | STANDARD PLAY HOURS | PLAYABLE GROUPS IN NUMBER | STANDARD PLAY HOURS | PLAYABLE GROUPS IN NUMBER | STANDARD PLAY HOURS | PLAYABLE GROUPS IN NUMBER | STANDARD PLAY HOURS |
| 1 | 3 | 0:10 | 3 | 0:15 | 3 | 0:10 | 3 | 0:10 |
| 2 | 2 | 0:07 | 2 | 0:10 | 2 | 0:07 | 3 | 0:10 |
| 3 | 3 | 0:10 | 3 | 0:20 | 4 | 0:19 | 4 | 0:20 |
| 4 | 1 | 0:05 | 1 | 0:05 | 1 | 0:03 | 2 | 0:08 |
| 5 | 3 | 0:15 | 3 | 0:16 | 3 | 0:18 | 1 | 0:04 |
| 6 | 2 | 0:10 | 2 | 0:12 | 3 | 0:14 | 1 | 0:08 |
| 7 | 3 | 0:15 | 4 | 0:21 | 2 | 0:12 | 4 | 0:21 |
| 8 | 2 | 0:08 | 2 | 0:10 | 4 | 0:10 | 3 | 0:17 |
| 9 | 2 | 0:08 | 1 | 0:08 | | 0:24 | 3 | 0:19 |

FIG.8
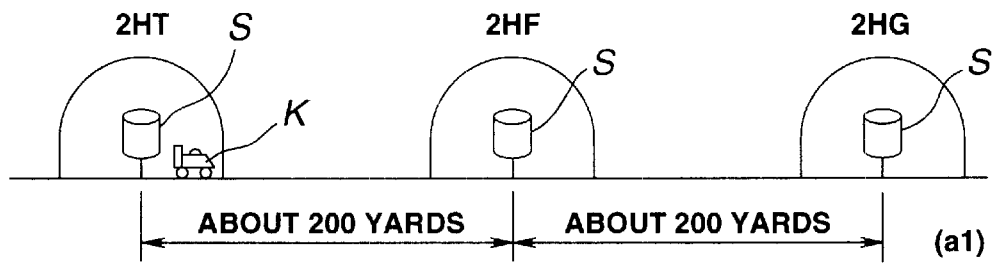
(a1)
① CART ON 2HT
| HOLE POSITION CART No. | 1H | | 2H | | | 3H |
|---|---|---|---|---|---|---|
| | T | G | T | F | G | T |
| 5 | 8:51 | 9:03 | 9:05 | | | |
(a2)
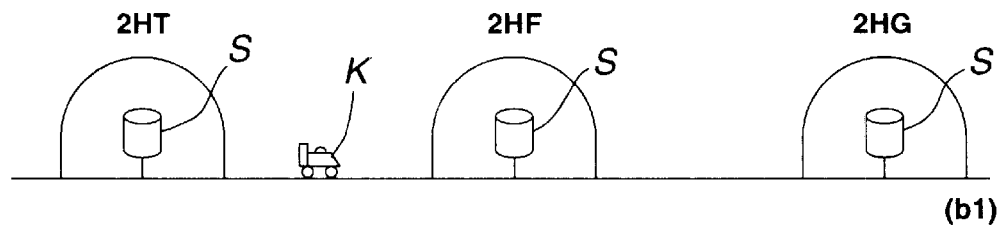
(b1)
② CART LEAVES FROM 2HT COMMUNICATION AREA AFTER TEE SHOT
| HOLE POSITION CART No. | 1H | | 2H | | | 3H |
|---|---|---|---|---|---|---|
| | T | G | T | F | G | T |
| 5 | 8:51 | 9:03 | 9:05 | ▨▨▨ | | |
(b2)
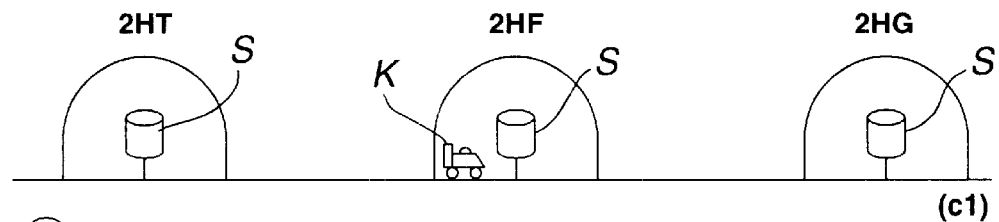
(c1)
③ CART IS WITHIN 2HF COMMUNICATION AREA
| HOLE POSITION CART No. | 1H | | 2H | | | 3H |
|---|---|---|---|---|---|---|
| | T | G | T | F | G | T |
| 5 | 8:51 | 9:03 | 9:05 | 9:11 | | |
(c2)

FIG.9 (PRIOR ART)

| CART NUMBER / HOLE POSITION | 1H | | | 2H | | | 3H | | | 4H | |
|---|---|---|---|---|---|---|---|---|---|---|---|
| | T | F | G | T | F | G | T | F | G | T | F |
| 3 | 8:00 | 8:04 | 8:10 | 8:15 | 8:24 | 8:31 | 8:34 | 8:42 | 8:50 | 8:54 | — |
| 7 | 8:06 | 8:10 | 8:13 | 8:19 | 8:31 | 8:33 | 8:45 | 8:51 | 8:58 | 9:07 | — |
| 9 | 8:12 | 8:13 | 8:17 | 8:24 | 8:35 | 8:47 | 8:51 | 8:59 | 9:04 | — | — |
| 18 | 8:18 | 8:23 | 8:31 | 8:38 | 8:43 | 8:49 | 8:57 | 9:01 | ▩ | — | — |
| 1 | 8:24 | 8:30 | 8:39 | 8:45 | 8:51 | 8:58 | 9:04 | — | — | — | — |
| 6 | 8:30 | 8:37 | 8:41 | 8:50 | 8:58 | 9:03 | — | — | — | — | — |
| 34 | 8:36 | 8:40 | 8:45 | 8:55 | 9:04 | — | — | — | — | — | — |
| 24 | 8:42 | 8:50 | 8:55 | 9:04 | ▩ | — | — | — | — | — | — |
| 56 | 8:48 | 8:56 | 9:01 | — | — | — | — | — | — | — | — |
| 30 | 8:54 | 9:04 | — | — | — | — | — | — | — | — | — |
| 38 | 9:00 | — | — | — | — | — | — | — | — | — | — |

FIG.10

| OUT COURSE | 1H | | | 2H | | | 3H | | | 4H | | | 5H | | | 6H | | | 7H | | | 8H | | | 9H | | |
|---|---|---|---|---|---|---|---|---|---|---|---|---|---|---|---|---|---|---|---|---|---|---|---|---|---|---|---|
| | T | F | G | T | F | G | T | F | G | T | F | G | T | F | G | T | F | G | T | F | G | T | F | G | T | F | G |
| | 0 | 0 | 0 | 0 | 1 | 0 | 0 | 0 | 0 | 0 | 1 | 1 | 0 | 0 | 0 | 0 | 1 | 0 | 0 | 1 | 1 | 1 | 0 | 0 | 0 | 0 | 0 |
| | 0 | | | 1 | | | 0 | | | 2 | | | 0 | | | 1 | | | 2 | | | 1 | | | 0 | | |

| IN COURSE | 10H | | | 11H | | | 12H | | | 13H | | | 14H | | | 15H | | | 16H | | | 17H | | | 18H | | |
|---|---|---|---|---|---|---|---|---|---|---|---|---|---|---|---|---|---|---|---|---|---|---|---|---|---|---|---|
| | T | F | G | T | F | G | T | F | G | T | F | G | T | F | G | T | F | G | T | F | G | T | F | G | T | F | G |
| | 0 | 0 | 0 | 1 | 1 | 0 | 0 | 0 | 0 | 0 | 1 | 0 | 0 | 1 | 0 | 0 | 1 | 0 | 1 | 0 | 0 | 1 | 1 | 0 | 0 | 1 | 0 |
| | 0 | | | 2 | | | 0 | | | 1 | | | 1 | | | 1 | | | 1 | | | 2 | | | 1 | | |

FIG.12
(PRIOR ART)

| HOLE POSITION / CART NUMBER | 1H | | | 2H | | | 3H | | | 4H | |
|---|---|---|---|---|---|---|---|---|---|---|---|
| | T | F | G | T | F | G | T | F | G | T | F |
| 3 | 8:00 | 8:04 | 8:10 | 8:15 | 8:24 | 8:31 | 8:34 | 8:42 | 8:50 | 8:54 | |
| 7 | 8:06 | 8:10 | 8:13 | 8:19 | 8:31 | 8:33 | 8:45 | 8:51 | 8:58 | 9:07 | |
| 9 | 8:12 | 8:13 | 8:17 | 8:24 | 8:35 | 8:47 | 8:51 | 8:59 | 9:04 | — | |
| 18 | 8:18 | 8:23 | 8:31 | 8:38 | 8:43 | 8:49 | 8:57 | 9:01 | — | — | |
| 1 | 8:24 | 8:30 | 8:39 | 8:45 | 8:51 | 8:58 | 9:04 | — | — | — | |
| 6 | 8:30 | 8:37 | 8:41 | 8:50 | 8:58 | 9:03 | — | — | — | — | |
| 34 | 8:36 | 8:40 | 8:45 | 8:55 | 9:04 | — | — | — | — | — | |
| 24 | 8:42 | 8:50 | 8:55 | 9:04 | — | — | — | — | — | — | |
| 56 | 8:48 | 8:56 | 9:01 | — | — | — | — | — | — | — | |
| 30 | 8:54 | 9:04 | — | — | — | — | — | — | — | — | |
| 38 | 9:00 | — | — | — | — | — | — | — | — | — | |

FIG. 13 (PRIOR ART)

| OUT COURSE | IN COURSE | XX COURSE |
|---|---|---|

| CART NUMBER / HOLE POSITION | 1H | | | 2H | | | 3H | | | 4H | |
|---|---|---|---|---|---|---|---|---|---|---|---|
| | T | F | G | T | F | G | T | F | G | T | F |
| 3 | 8:00 | 8:04 | 8:10 | 8:15 | 8:24 | 8:31 | 8:34 | 8:42 | 8:50 | 8:54 | — |
| 7 | 8:06 | 8:10 | 8:13 | 8:19 | 8:31 | 8:33 | 8:45 | 8:51 | 8:58 | 9:07 | — |
| 9 | 8:12 | 8:13 | 8:17 | 8:24 | 8:35 | 8:47 | 8:51 | 8:59 | 9:04 | — | — |
| 18 | 8:18 | 8:23 | 8:31 | 8:38 | 8:43 | 8:49 | 8:57 | 9:01 | — | — | — |
| 1 | 8:24 | 8:30 | 8:39 | 8:45 | 8:51 | 8:58 | 9:04 | — | — | — | — |
| 6 | 8:30 | 8:37 | 8:41 | 8:50 | 8:58 | 9:03 | — | — | — | — | — |
| 34 | 8:36 | 8:40 | 8:45 | 8:55 | 9:04 | — | — | — | — | — | — |
| 24 | 8:42 | 8:50 | 8:55 | 9:04 | — | — | — | — | — | — | — |
| 56 | 8:48 | 8:56 | 9:01 | — | — | — | — | — | — | — | — |
| 30 | 8:54 | 9:04 | — | — | — | — | — | — | — | — | — |
| 38 | 9:00 | — | — | — | — | — | — | — | — | — | — |

GOLF CART LOCATION DISPLAY DEVICE

BACKGROUND OF THE INVENTION

1. Field of the Invention

The present invention relates to a golf cart location display device that locates golf carts on a golf course.

2. Discussion of the Background

Recently, there are golf courses where a player plays golf while he moves a golf cart by himself.

In the case of the self-playing, the golf manager cannot grasp the crowded degree of a course and a delay in playing until a player returns to a clubhouse from the start tee. To avoid such situation, some golf courses have course guides posted every several holes to accelerate golf playing. The problem is that personnel expenses increase.

For example, Japanese Laid-open patent publication TOKKAI-HEI No. 9-31855 or 10-28504, previously filed by the present applicant, discloses the system consisting of means mounted on a golf cart, for transmitting and receiving cart identification signals such as cart Ids; sensors placed along the golf course being a golf cart route (near to e.g. tee ground, fairway, green and the like); and a management office which manages cart identification signals detected by a sensor.

The operation status of a golf cart on a golf course can be grasped by managing the current location of each cart, for example, the time detected by the sensor, based on cart identification signals and sensor identification signals, and then displaying it on a desired display.

In such operation, the location and the operation time of a golf cart can be grasped. However, the display mode of management data may be considered as follows:

FIG. 12 illustrates a window system wherein an operation status table is displayed on a display device of a personal computer.

On the window 70, golf cart numbers on a current course are shown in the cart number columns 71. The starting order of golf carts is vertically arranged.

The time display areas 72a, 72b, 72c, . . . are prepared. The time at which the sensor situated on a hole detects a golf cart, that is, the operation status thereof is displayed in each column. In the time display area 72(a, b, c, . . . ), "T" (tee ground) is the time at which the sensor situated near the tee ground detects a golf cart; "F (Fairway)" is the time at which the sensor situated near the fairway detects a golf cart; and "G (Green)" is the time at which the sensor situated near the green detects a golf cart. For example, "8:35" represents the time at which the No. 9 golf cart passed the fairway F near to No. 2 hole. The time display area 72c shows that the No. 9 golf cart has been currently detected on the green G of No. 3 hole.

The window shows that the No. 9 golf cart is engaged to a golfer playing on the green G of No. 3 hole or is on the way toward the tee ground of No. 4 hole after a completion of playing on the green of No. 3 hole.

As described above, since each of the golfs cart displays the time detected by the sensor corresponding to the tee ground T, fairway F or green G of each hole, the manager can grasp the play progress of a party using the golf cart.

The operation status of golf carts behind the No. 38 golf cart can be displayed on the window 70 by clicking the mouse and scrolling the display area.

The display area is scrolled downward or upward by selecting and clicking the scroll key 73a or 73b (not shown) on the scroll bar 73. For example, when you want to know the operation status of a golf cart advancing behind the No. 38 golf cart, the display area is scrolled down with the scroll key 73b. This scroll operation may be done by dragging upward or downward the scroll box 73c along the scroll bar 73.

The status of holes behind No. 4 hole can be selectively displayed by scrolling the display area leftward or rightward with the scroll keys 74a and 74b or the scroll box 73c on the scroll bar 74.

It is assumed that FIG. 12 illustrates the case where the window 70 displays the operation status of one course. However, an actual golf ground has plural courses. Regarding another displaying mode, FIG. 13 illustrates the display mode in which plural pieces of information corresponding to the plural courses are selectively displayed.

FIG. 13 shows the window 80 employing the so-called folder display mode. The operation status of a desired course can be displayed by selecting the tag 80a, 80b or 80c through a predetermined operation of a mouse. The window 80 of FIG. 13 is identical to the window 70 of FIG. 12. The active window shows, for example, the operations status of "OUT course". When the tag 80b is selected, the window 80 displays the operation status of "IN course". If the tag 80c is selected, the window 80 displays the operation course of "xx course".

In addition to the above numerical displaying method, it may be considered that the layout of golf courses in a golf ground are displayed as computer-graphics on the window 90 and that the locations of golf carts (represented with black dots) are displayed near a hole, as shown in FIG. 14. The relationships between locations of golf carts on each course can be easily grasped at a glance. In order to monitor the situation of holes other than the currently displayed holes, the corresponding display area is selected using the scroll bars 91 and 92. Regarding the scroll bars 91 and 92 and the scroll bars 73 and 74, the same numerical subscript represents the same function.

The case where operation information is displayed on the display of a computer has been described by referring to FIGS. 12, 13 and 14. Moreover, it may be considered that a relative large display 110 such as a liquid-crystal panel, as shown in FIG. 1, displays the image corresponding to the course layout and operation status created by the computer 100. This example has the advantage in that plural users can monitor the entire golf ground at the same time.

Most golf grounds generally contain 18 holes (2 courses), 28 holes (3 courses) and 36 holes (4 courses), in 9 hole-units. In the examples shown in FIGS. 12, 13 and 14, in order to simultaneously monitor the operation status of the entire courses of the golf ground, a desired operation status is displayed by selecting operating the scroll bars 73, 73, 91 and 92 or the tags 80a, 80b and 80c. For that reason, it has been difficult to the entire operation information on the same screen.

Moreover, in an operation of displaying the operation information of a golf course, it is difficult to display the operation information for nine holes including the No. 1 to No. 9 holes on the same screen. This requires the scroll operation.

That is, in the operation status monitoring operation, the selective manipulation of the scroll bars 73, 73, 79 and 79 or the tags 80a, 80b and 80c impairs the immediacy thus resulting in poor usability. This problem causes the golf ground administrator to involve in the operation management much time, thus delaying other work.

When the course layout of a golf ground is constructed as shown in FIG. 14, the relationships between cart locations can be easily grasped. However, the operation management system producer must develop the course layout to be suitable for each golf ground. Many efforts are required to deal with many golf grounds. Like the examples shown in FIGS. 12 and 13, when the layout of the golf ground is displayed on the monitor of a computer, as shown in FIG. 14, the volume of information to be displayed is confined.

The example shown in FIG. 5 enables to obtain a great volume of information from the same screen. However, the problem is that a special installation place is required to enlarge the display device.

SUMMARY OF THE INVENTION

The present invention is made to solve the above-mentioned problems.

Moreover, the objective of the invention is to provide a golf cart location display device that can more schematically display the operation status of golf carts using predetermined graphic information.

The objective of the present invention is achieved by a golf cart location display device, comprising receiving means for receiving identification information about each of golf carts moving within a golf course as well as information about a current location of a golf cart within the golf course; operation status table creating means for creating an operation status table on which the current location of the golf cart is displayed on a straight line; golf cart location creating means for superimposing character/graphic information about the moving status of a golf cart received by the receiving means with character/graphic information, on the line of the operation status table; and display means for displaying the operation status table as an image.

Moreover, according to the present invention, a golf cart location display device, comprises receiving means for receiving identification information about each of golf carts moving within a golf course as well as information about a current position of a golf cart within the golf course; operation status table creating means for creating an operation status table on which play progress of the golf cart is displayed as a bar graph; golf cart location creating means for superimposing information about play progress related to the golf cart received by the receiving means with character/graphic information, on the operation status table; and display means for displaying the operation status table as an image.

In the golf cart location display device according to the present invention, time information corresponding to the play progress information shown in the bar graph is displayed at a position corresponding to the bar graph.

Hence, the present invention can more schematically display the operation status of golf carts using predetermined graphic information. This allows the operation status of the entire course to be grasped within a narrow window area, compared with the numerical display of play hours or the layout display of a golf ground. In other words, the monitor of a personal computer can display the operation status of the entire course on the same screen. Moreover, since the operation status of the entire course can be visually displayed graphically, it can be understood easily and intuitively.

Furthermore, according to the present invention, a golf cart location display device comprises receiving means for receiving identification information about each of golf carts moving within a golf course as well as information about a current location of a golf cart with the golf course; operation status table creating means for creating an operation status table containing play progress information or information about current location information of said golf cart; golf cart location creating means for displaying information about arrival of the golf cart received by the receiving means, on display columns of the operation status table, and for flashing or displaying in a different display color a display column for the next spot when the golf cart does not receive current location arrival information for a predetermined period of time; and display means for displaying the operation status table as an image.

Moreover, according to the present invention, a golf cart location display device comprises receiving means for receiving identification information about each of golf carts moving within a golf course as well as information about a current location of a golf cart within the golf course; operation status table creating means for creating an operation status table on which play progress of the golf cart is displayed as a bar graph and on which a display column for the next spot is flashed or displayed in a different display color when the golf cart does not receive current location arrival information for a predetermined period of time; golf cart location creating means for superimposing information about play progress of the golf cart received by the receiving means with character/graphic information, on the operation status table; and display means for displaying the operation status table as an image.

As described above, the present invention can distinctively display the status in play and the status in movement toward the next spot (position) after playing, thus resulting in finer control.

BRIEF DESCRIPTION OF THE DRAWINGS

This and other objects, features, and advantages of the present invention will become more apparent upon a reading of the following detailed description and drawings, in which:

FIG. 4 is a diagram explaining the display mode of an operation status table for all golf courses;

FIG. 5 is a diagram explaining a screen for setting the number of player groups and playing hours for each hole;

FIG. 8 is a diagram explaining a display mode representing to a cart moving toward the next spot;

FIG. 9 is a diagram illustrating a conventional operation status table with time display, which indicates that a cart is in motion;

FIG. 10 is a diagram illustrating an operation status table for a course with 18 holes, indicating carts in motion;

FIG. 12 is a diagram explaining the display mode of a conventional operation status table on which a cart arrival time at each spot is displayed;

FIG. 13 is a diagram illustrating the display mode of a conventional operation status table in a folder system;

DETAILED DESCRIPTION OF THE PREFERED EMBODIMENTS

An embodiment of a golf cart location display device according to the present invention will be described below with reference to the attached drawings.

Figure 1:
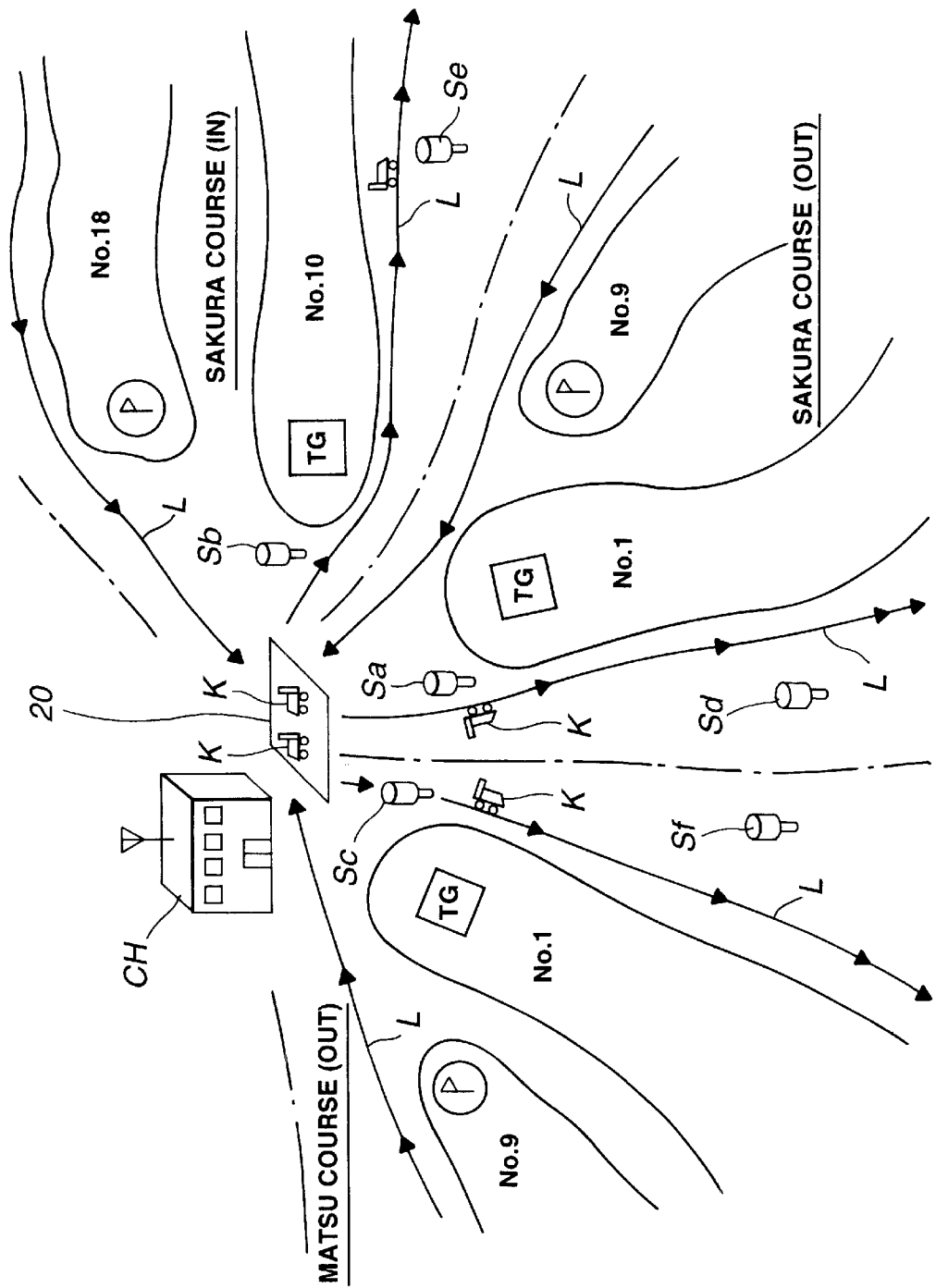
FIG. 1 is a schematic diagram partially illustrating the layout of a golf ground where golf cart location display devices according to the present invention are dotted.

FIG. 1 is a schematic diagram partially showing the layout near the start points of golf courses employing the golf cart location display devices according to the present embodiment. For convenience, FIG. 1 shows SAKURA (cherry in Japanese) course (OUT), SAKURA course (IN), and MATSU (pine in Japanese) course, each defined with chain lines, and further shows the vicinity of the start spot (TG) (Tee Ground) of each course. MATSU course (IN) (not shown, but to be described later) is displayed on the golf ground. Hence, the golf ground contains four golf courses.

As shown in FIG. 1, an administration or management office CH with a caddie master room is near the start points GT of the courses. This office CH has the operation management section and a display device. The management section controls the operation state of a golf cart K (hereinafter merely referred to as "cart") moved by players (e.g. a party of plural players) along the cart route L of a golf course. The display device displays operation states provided from the management section.

Near the management office CH, there is a cart dispatching lot 20 where carts K are dispatched to players for a course. For self-playing, players rent a predetermined cart K and then go to the start point TG.

Sensors Sa, Sb, Sc, Sd, Se, Sf, . . ., each which detects the presence of a cart K (in halt or passage) or transmits location information to the cart K, are respectively installed at predetermined positions along the cart path L of a course. FIG. 1 partially shows the deployed sensors. The sensors S are installed at positions corresponding to the tee ground, the fairway, and the green of each hole.

The transmission-only means or transmission/reception means is used as the sensor S. The sensor S outputs sensor identification information (sensor ID) representing a cart K assigned to a course or receives cart identification information (such as cart IDa, cart number, or the like) transmitted from a cart which is passing the sensor S, and then transmits it to the management office CH, together with the sensor ID.

Transmission means or transmission/reception means is mounted on each cart. The transmission means either transmits cart ID to the sensor S or converts the sensor ID transmitted from the sensor S and the cart ID into a packet form and then transmits the packet to the management office CH.

Figure 2:
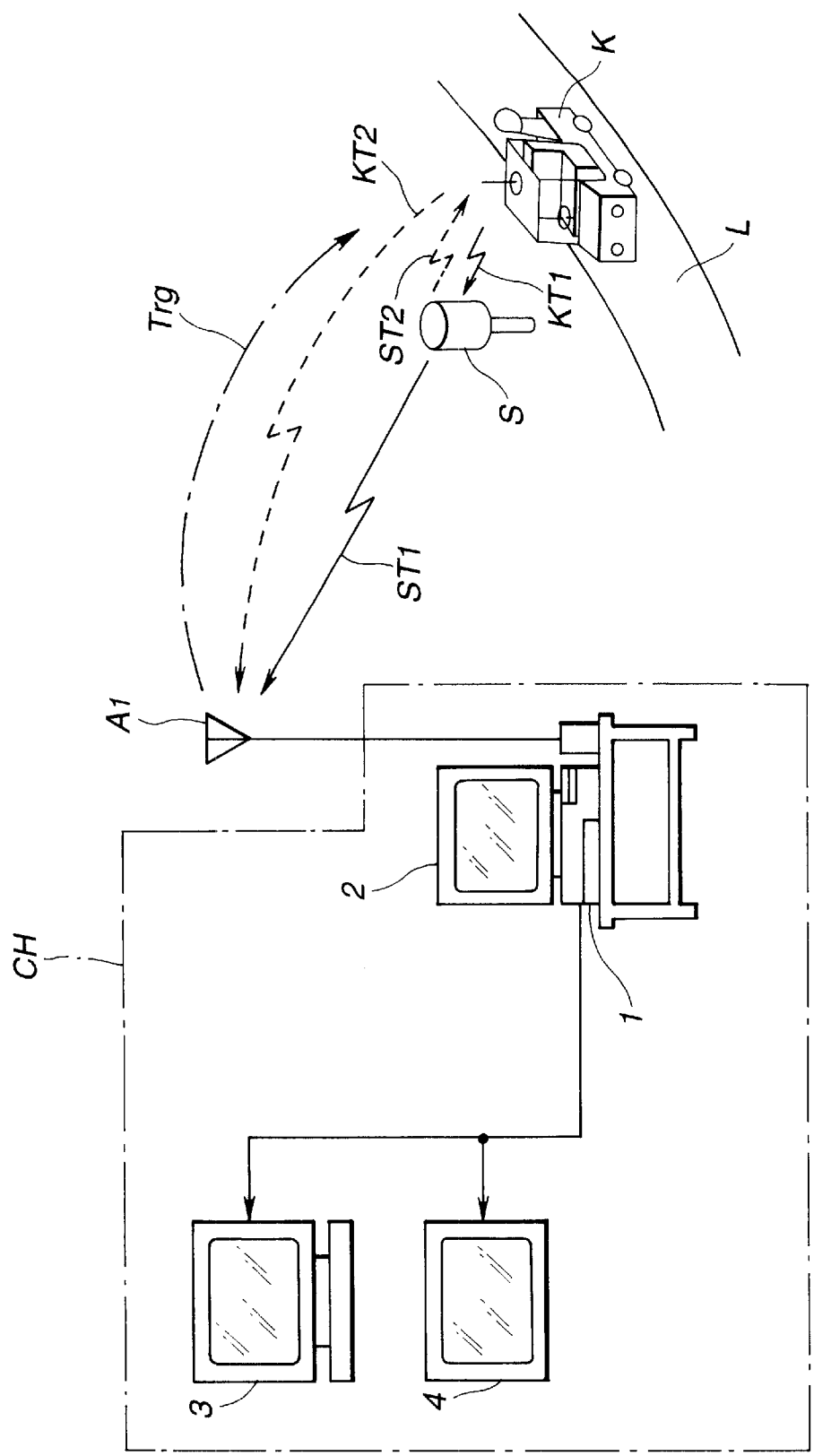
FIG. 2 is a diagram for explaining communication route between sensors, carts and a management office.

FIG. 2 is a conceptual diagram of the system that transmits cart movement information to the management office CH, according to the present embodiment. Two transmission methods are shown in solid lines and dotted lines.

The method depicted in solid lines uses feeble radio transmission/reception means acting as transmission means equipped to the cart K. The cart ID in a packet form is handled as data KT1. When the cart K passes by the sensor S in, for example, fixed intervals, the transmission/reception means transmits the packet cart ID to the sensor S. The sensor S transmits both the cart ID and the self-location as data ST1 to the management office CH directly or via the repeater installed within the course.

As shown with broken lines, the feeble radio transmitter (with a reception range of 3 to 10 m) mounted on the sensor S transmits location information of the sensor S, or data ST2, to the transmitter/receiver mounted on a cart K passing by the sensor. The cart K receives the location information of the sensor S and transmits as data KT2 the location information and the self ID directly or indirectly to the management office CH.

As described above, two methods are available to perform transmission and reception between the cart K and the management office CH. In either method, data transmitted and received between the management office and each cart or between sensors are converted into packets. Then the packets are transmitted and received within a time slot allocated to each cart.

The management office CH directly or indirectly transmits the trigger signal Trg (shown in chain lines) acting as synchronous information to each cart K so that the time division transmission/reception control can be performed for each cart.

The management office CH includes an operation management section 1 that inputs cart IDs received Via the antenna A1 and data ST1 or KT2 representing location information thereof, and a display unit 2.

The operation management section 1 consists of, for example, a personal computer and has a low-power receiver that receives data ST1 or KT2. The administrator section 1 can create image information for displaying an operation status table in a window mode (to be described later). The display unit 2 in a personal computer can monitor the operation status table.

It is not essential that the display unit is paired with the operation management section 1. Plural display units 3, with the same function as the display unit 2, can display the operation status. The operation management unit 1 and the display unit 3 may be respectively installed in different rooms. Thus the golf manager can grasp the operation status at different places. The display device for a personal computer makes it easy to find its suitable installation place in, for example, the control room.

Moreover, a relatively large display unit 4 such as a liquid crystal display panel may be installed in a lobby. Thus, golfers in the lobby may watch the operation status through the image information on the display unit 4.

Referring back to FIG. 2, when the management office CH requests the sensor ID and the cart ID, each cart K sets its transmission timing in synchronism with the trigger Trg transmitted from the management office CH and then transmits the ID card.

Figure 3:
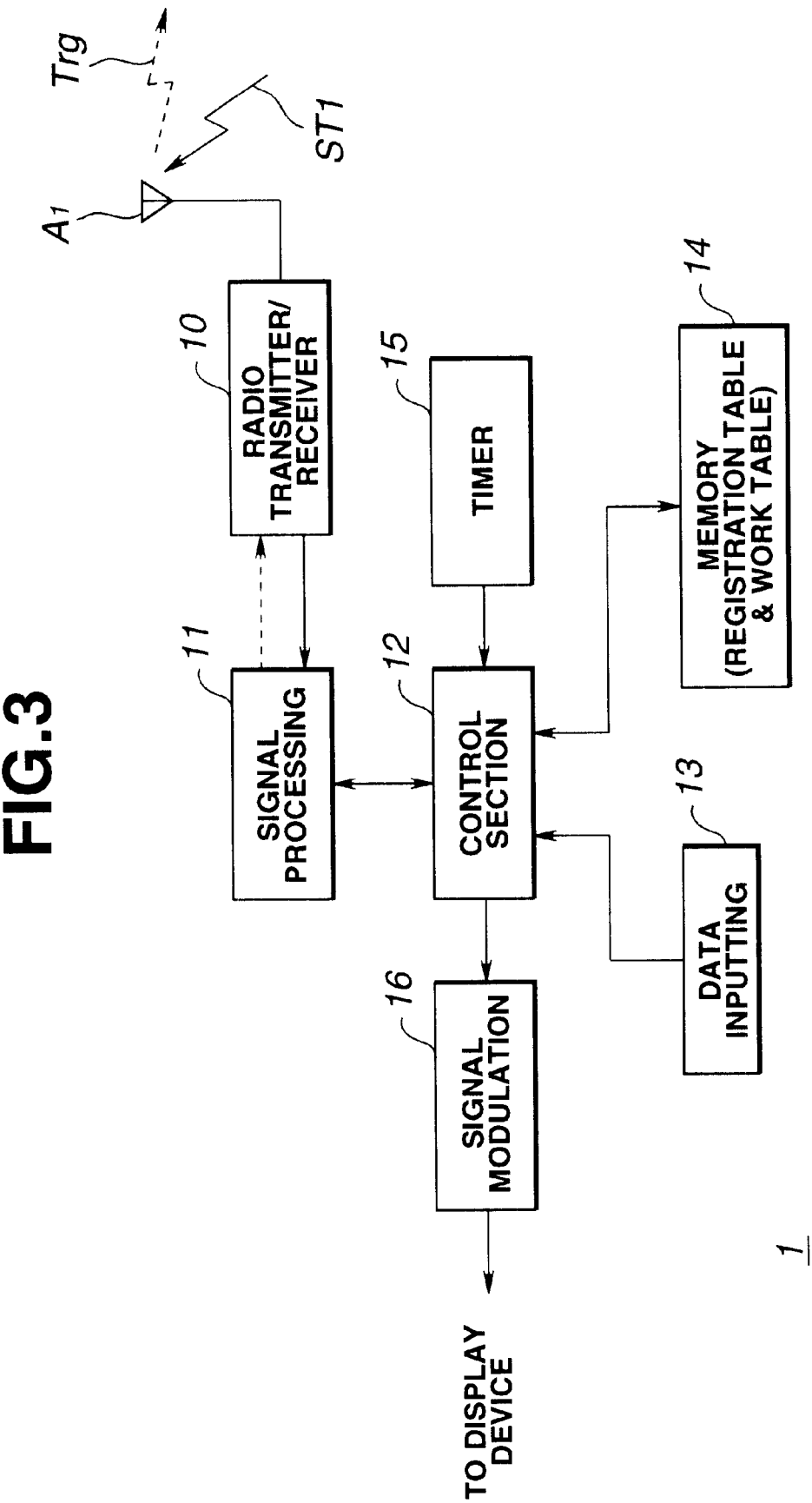
FIG. 3 is a block diagram illustrating the configuration of an operation management section installed in a management office.

FIG. 3 is a block diagram illustrating the configuration of the operation management unit 1.

The radio transmitter/receiver 10 receives data ST1 or data KT2 (card ID or sensor ID) transmitted from the sensor S or cart K via the antenna A1. The signal processing unit 12 performs a predetermined signal process to the data ST1 or the data KT2 received by the radio transmitter/receiver 10. Thus the cart ID and the sensor ID are demodulated and then supplied to the control unit 12. The control unit 12 executes an information process to control the operation status of the cart K based on received information (cart ID and sensor ID), and then creates character/graphic signals to display the resultant information on the display unit 2.

The data input unit 13 is an input device such as a keyboard. By using the keyboard, the golf ground manager can set the play standard hour of each hole and the number of playable groups. If necessary, the input unit 13 can input player's names (party representative's name or all player's names) reserved on the day. The input unit 13 may be used to input various kinds of setting for the window display.

The memory 14 is formed of a ROM 14a for storing image data to create an operation status table in, for example, a window mode and a RAM 14b acting as a work area for displaying cart operation information, obtained through the information process, superimposed with the image data.

The timer 15 detects a cart detection time of the sensor or a sensor-identification (ID) detection time of the cart. That is, how long a cart takes to come to a location of a course corresponds to an operation status.

The signal modulation unit 8 modulates character/graphic signals created by the control unit 12 and then supplies the modulated signals to the display unit 2 (not shown).

Next, a display mode of an operation status table will be described below as an example.

Figure 4:
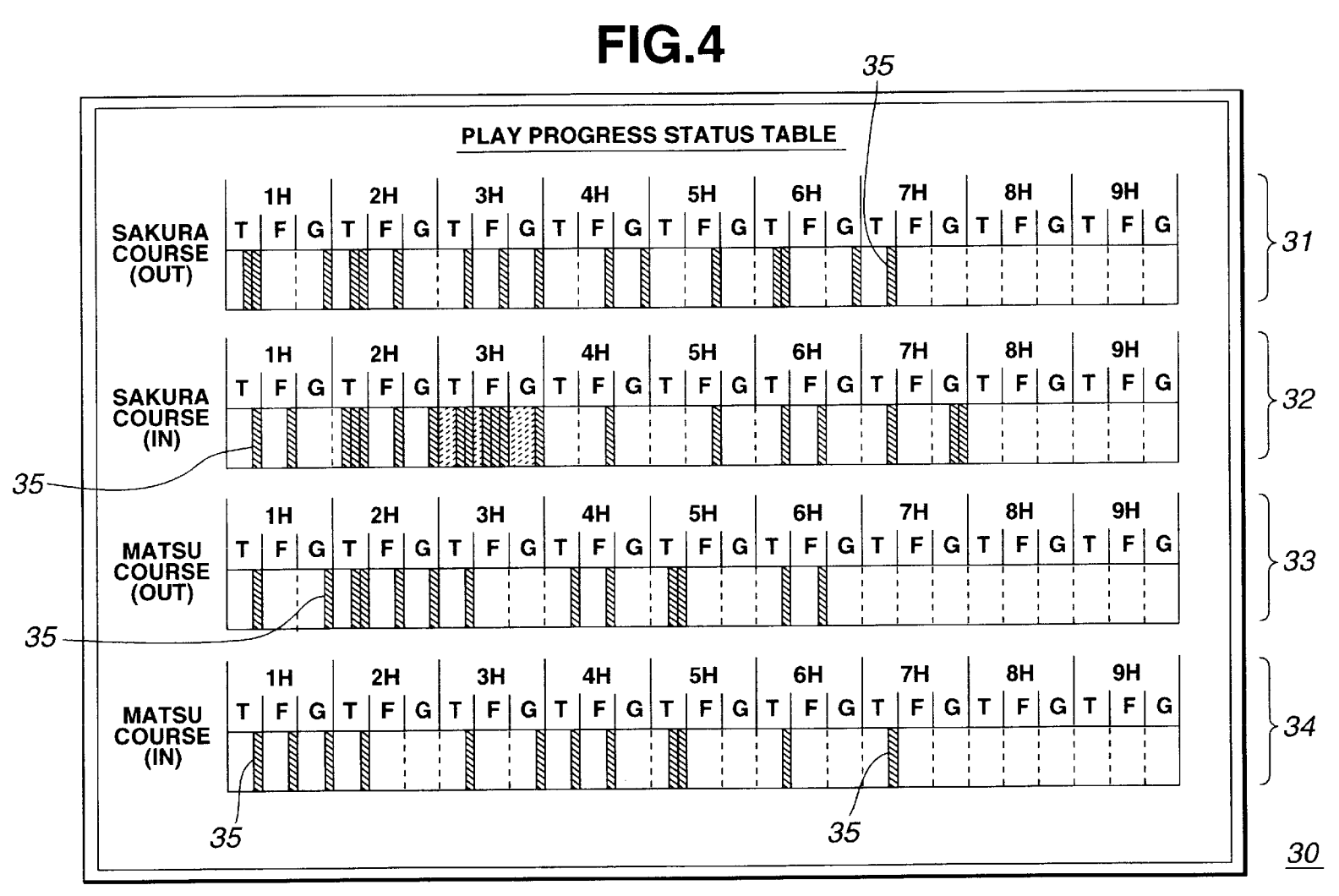

FIG. 4 is a diagram explaining the configuration of the window 30 acting as an operation status table displayed on the display unit 2.

The course display areas 31, 32, 33 and 34 in a golf ground are horizontally arranged on the window 30. The course display area 31 shows the operation status of SAKURA course (out). The course display area 32 shows the operation status of SAKURA course (IN). The course display area 33 shows the operation status of MATSU course (OUT). The course display -area 34 shows the operation status of MATSU course (IN). In each of the course display areas 31, 32, 33 and 34, cart location display areas corresponds to the tee ground T, the fairway F and the green G of each of No. 1 to No. 9 holes (represented as 1H to 9H).

The cart location display area can show whether the sensor installed to each of the tee ground, fairway and green of each hole has detected a cart. The cart mark 35 represents the cart detection status. In FIG. 4, it is assumed that the cart mark 35 corresponds to a single cart. Plural cart marks can be displayed on the cart position display area.

FIG. 4 shows that two carts are detected on the tee ground of No. 1 hole (1H) in the SAKURA course (OUT) and that one cart is detected on the green of No. 1 hole (1H) in the SAKURA course (OUT). When the cart moves from the current state after playing and the sensor at the next post detects the cart, the corresponding cart mark 35 moves rightward.

Referring back to FIG. 4, let us now assume that the cart corresponding to the cart mark 35 on the green G of No. 3 hole (3H) in the SAKURA course (OUT) moves to the tee ground of No. 4 hole (4H). In this case, the sensor corresponding to the tee ground of No. 4 hole detects the cart. Then, the cart mark 35 corresponding to the green G of No. 3 hole (3H) disappears. Instead, the car mark 35 corresponding to the tee ground T of No. 4 hole (4H) appears.

Where cart marks 35, represented as No. 1 hole (1H) to No. 3 hole (3H) of the MATSU course (IN), are lined at predetermined intervals, the game is in a smooth progress on the actual course.

A relatively great number of carts marks 35 are displayed ranging from No. 2 hole (2H) to No. 3 hole (3H) in the SAKURA course (IN). This shows that the play is in a jammed state. Particularly, when many cart marks 35 are jammed as shown in No. 3 hole, the background color against the cart marks is changed to emphasize the golfing in a crowded state or each cart mark 35 is flashed. This display process distinguishes the display status of other holes and facilitates to grasp the course conditions in more detail.

Moreover, as the No. 6 hole (6H) of MATSU course (IN) shows, the display mode of the cart mark 35 is changed when carts in front of and behind the hole, causing a jammed state, are not detected between holes but the respective play time is too long, (to be described later).

The display mode differentiation depends on the play hour and the number of play groups for each course predetermined by the manager.

FIG. 5 is a diagram explaining the configuration of the window 40 that sets the play hour and the number of playing groups on each course.

The hole display area 41 shows hole numbers to be set. The number of groups which can play in the course layout (long hole, middle hole, and short hole) (playable group count or cart count) can be input to the playgroup-count display areas 42a, 42b, 42c and 42d. The play standard hour for each hole is input to the play hour areas 43a, 43b, 43c and 43d. The data input unit 13, shown in FIG. 3, sets data regarding play hour and the number of playable groups.

In this example, three groups can play on No. 3 hole (3H) of the SAKURA course (IN). The play hour is set to about 20 minutes. Referring back to FIG. 4, the window shows that five groups (five carts) were actually detected. This jammed state is easily grasped by flashing No. 3 hole. The play hour is set to about 8 minutes for No. 6 hole in MATSU course (IN). When the play hour exceeds 8 minutes being a standard hour, the display mode (e.g. display color) of the cart mark 35 is changed as shown in FIG. 4.

The system operation start is initialized on the window 40. The initial setting may be temporarily changed with reference to the play operation status.

In each of the course display areas 31, 32, 33 and 34, each of holes (1H to 9H) is divided into the tee ground T, fairway F and green G. In an actual course, the short hole contains no fairway. When the screen of FIG. 4 shows a short hole, the fairways F of the holes (1H to 9H) may be displayed, for example, with the symbol × or in dark display color to notice that cart location display is ineffective. The long hole, which has a long fairway, is displayed, for example, as FL (where L represents the first letter of "long") in the course display areas 31, 32, 33 and 34.

In each of the course display areas 31 to 34, the cart mark 35 can schematically show the locations of carts on holes consisting of each course. The golf ground manager can intuitively grasp with cart marks 35 on the same screen.

The operation status can be more grasped by changing the display mode of the cart mark 35 with reference to the playable group count and playable standard hour which are predetermined.

According to the present invention, when the sensor detects the location information of a golf cart, the window 30 (shown in FIG. 4) can be displayed based on the detected location information. Hence, the present invention provides the versatility to golf grounds with various kinds of course layouts.

Referring to FIG. 4, the course display areas 31 to 34 corresponding to four courses on the window 30 has been described as an example. However, the number of course display areas may correspond to the number of courses constructed in a golf ground. The golf ground manager can arbitrarily set the display mode of the window 30.

It is not essential to allocate one cart mark to one golf cart. One cart mark with a changed width may represent plural carts, for example, three carts.

Referring to FIG. 4, each cart mark 35 is displayed based on the operation status of each cart on a course. Hence, the operation status of each cart can be monitored. When a specific cart mark 35 displayed on one of the course display areas 31 to 34 is selectively clicked, the operation status of the corresponding cart may be displayed on another window.

Figure 6:
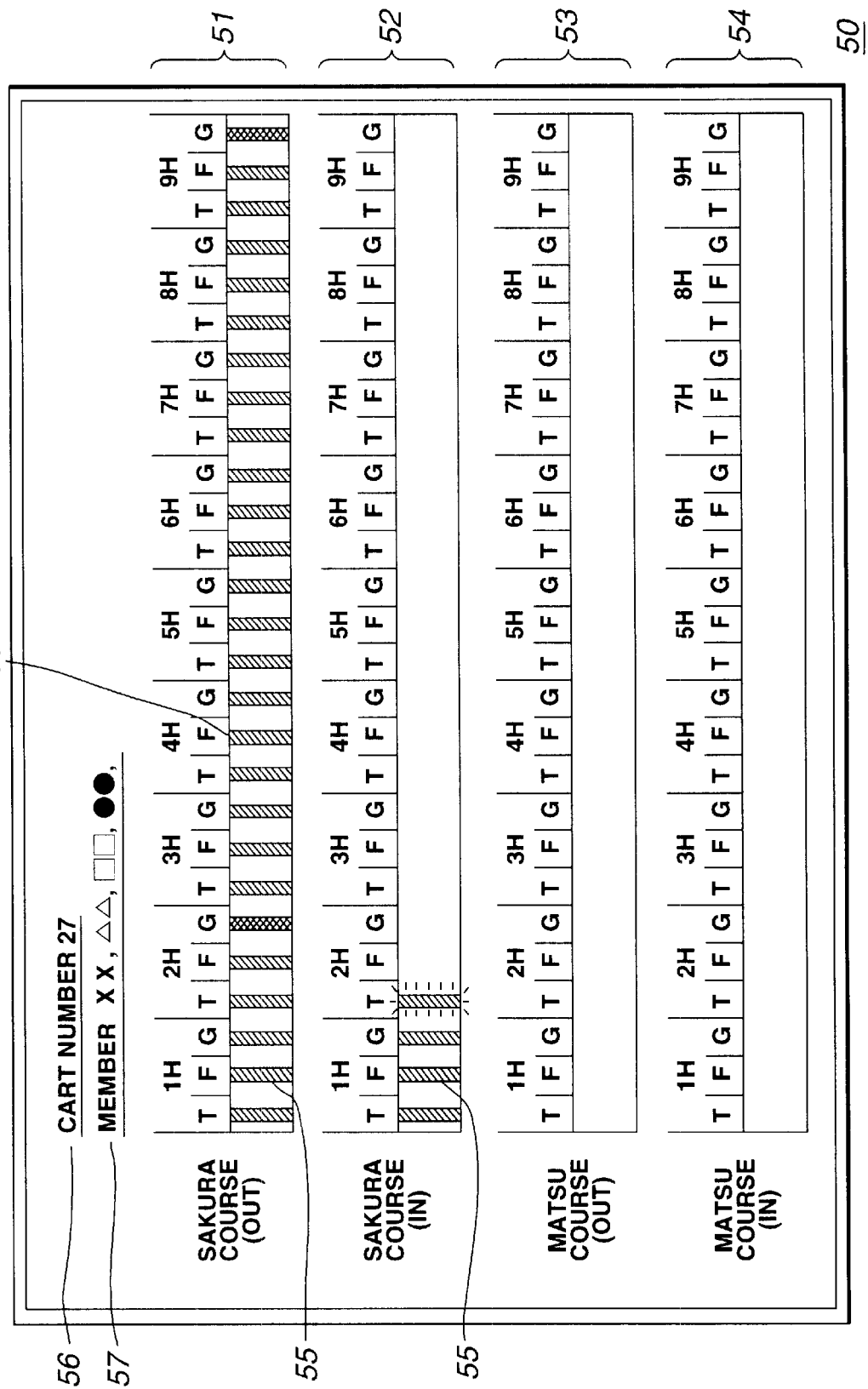
FIG. 6 is a diagram explaining the display mode of an operation status table for each cart.

FIG. 6 is a diagram explaining the display mode of the window 50 displaying an operation status table of each cart.

Each of the course display areas 51 to 54 is the play history of each cart and shows a completion of the play at the location of each cart mark 55 ended. In this example, after a completion of playing in SAKURA course (OUT), a golfer is playing on the tee ground T of No. 2 hole in the SAKURA course (IN). In this case, flashing the cart mark 55 of No. 2 hole (2H) makes it easy to currently locate carts.

As to the green G of No. 2 hole (2H) in SAKURA course (OUT) and the green G of No. 9 hole (9H) in SAKURA course (OUT), the cart mark 55 with a different display color, e.g. red, represents stagnation of playing.

A cart number representing the cart ID of a cart occupies the cart number area 56. A player's name using a cart occupies the member name area 57. The cart ID is transmitted from, for example, a cart. A manager uses the data input unit 13 of FIG. 3 to input player's names for each cart. Since the operation status of each cart can be selectively displayed, the manager can recognize a cart engaged in a specific hole.

The cart can be located at the time the cart mark 35 is selected on the window 30. Hence, the window may display the cart area 56 and the member's name area 57.

Next, another embodiment will be described below.

Figure 7:
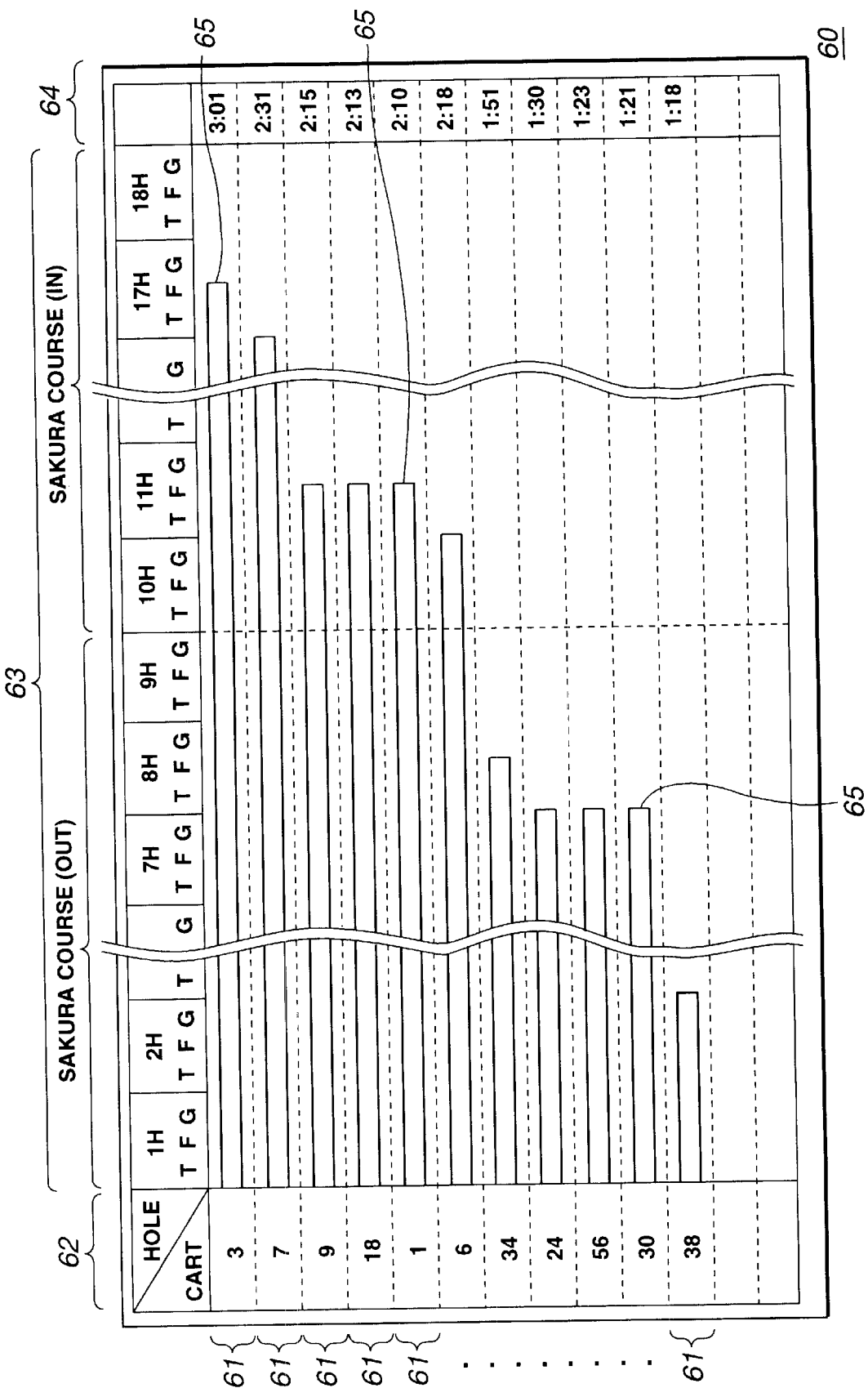
FIG. 7 is a diagram explaining a modification of the display mode of an operation status table.

FIG. 7 is a diagram explaining the configuration of the window 60 on which the cart operation status is displayed in a bar graph mode.

The window 60 displays the cart operation status with, for example, vertically extended bars. Operation status portions 61, 61, 61, . . . 61 each showing the operation status of a cart are vertically arranged on the window 60. The cart display portion 62 displays cart numbers vertically arranged in a cart starting order. This example indicates that the corresponding carts have started in the order of the cart numbers 3, 7, 9, . . . , and 38. The course display area 63 shows two courses having a total of 18 holes including, for example, SAKURA course (OUT) SAKURA course (IN), and the like. For convenience, each course is partially shown but, in actual case, is completely displayed on the same screen.

The play time display area 64 displays the time period between the starting time and a current time on No. 1 hole.

Each bar indicator 65 extends rightward (with respect to the paper orientation) every time respective sensors detect a cart in progress of playing after a starting time.

Specifically, the bar 65 indicates that the No. 3 cart is engaged in playing on the fairway F of No. 8 hole (17H) of SAKURA course (IN) after a completion of playing in SAKURA course (OUT). The area 64 shows that the time period between the start time and the current time is 3 hours and one minute. As described above, the bar indicator 65 can tell the operation status of a cart with the horizontal bar length.

The window 60 indicates that No. 9, 18 and 1 carts are on the fairway F of No. 7 hole in SAKURA course (IN). Of the three carts, since the first started No. 9 cart is slow, No. 18 and 1 carts are stagnated in progress of playing. This situation is applicable to the Nos. 24, 56 and 30 carts. A delay of the No. 24 cart causes the jamming of the Nos. 56 and 30 carts. Even in this case, the operation status can be easily monitored by changing the display mode of the bar indicator 65 related to the currently jammed hole.

An application of the bar indicator 65 makes it easy to intuitively understand the relative location of a certain cart in the whole play schedule.

Each of the screens (windows) shown in FIGS. 4, 5, 6 and 7 can be created with the same application software function. After a start-up of the application software, the window can be properly and selectively displayed through icon manipulation or pull-down menu selection.

The above-mentioned displaying methods can sufficiently display the statuses of all carts. However, it cannot be judged whether a cart is engaged in playing at a spot (e.g. the tee ground T of 2H) or the cart is moving to the next spot (the fairway F of 2H). In either case, the window displays the time at which the cart has arrived at a lately arrived spot (in this case, the tee ground T of 2H). Therefore if the window shows three carts on the tee ground T of the hole (2H), the play may appear to be in a jammed state. However, in an actual case, the fairway F of the hole (2H) may not jammed because players of two groups are going toward the fairway F of the next hole (2H).

In another embodiment of the present invention to be next described, the window can distinctively display whether players are in golfing or in going toward the next spot, without an increase of the display frame in number, whereby finer management can be performed.

FIGS. 8(a1), 8(b1) and 8(c1) schematically show the status of a transmission area of each position sensor S. Each of FIGS. 8(a2), 8(b2) and 8(c2) partially shows the window of FIG. 12, having the conventional operation status table with a spot arrival time display, and particularly shows the portion related to No. 2 hole.

For convenience, it is assumed that the system of transmitting and receiving radio signals between a sensor and a cart operates as follows. That is, referring to FIG. 8(a1), the sensor S installed near a hole periodically generates its ID with radio signals such as feeble waves or infrared rays. A cart with a radio receiver recognizes its position from the nearby sensor. In some cases, the position sensor may receive the cart ID transmitted from a cart.

Regarding the No. 2 hole, the position sensors are respectively installed on the tee ground, the fairway and the green. In this example, the position sensors S are installed at intervals of about 200 yards. The communication area of each position sensor S has a radius of about 15 meters with respect to the position sensor S. Carts K out of the communication area cannot receive data about location information of the position sensor S.

Referring to FIGS. 8(a1) and 8(a2), the No. 5 cart K exists in the communication area of the position sensor S on the tee ground T of the hole (2H). This shows that the player (or group) renting the No. 5 cart K is playing on the tee ground of the hole (2H). On the operation status table window, the 2HT display column displays the time, 9:05 at which the No. 5 cart arrived at 2HT.

After the tee shot, the player goes toward the fairway, together with the No. 5 cart. When the No. 5 cart leaves from the communication area of the 2HT position sensor S, it does not receive signals from the 2HT position sensor.

FIGS. 8(*b*1) and 8(*b*2) show the case where the cart K has left from the communication area of the position sensor. The cart K is advancing toward the fairway and does not receive signals from the 2HT and 2HF position sensors S.

On the position status table window, the 2HF display column for the next position is displayed in a different color or flashed.

The manager can understand at a glance from the flashing display that the No. 5 cart K has left the tee ground 2HT of No. 2 hole and then is going for the fairway 2HF.

When the cart K arrives to the fairway 2HF, as shown in FIG. 8(*c*1), it receives signals from the 2HF position sensor S. Then, as shown in FIG. 8(*c*2), the arrival time is displayed on the 2HF display column on the operation status table window. The different color displaying or flashing, stressing the status in progress, is returned to the normal display mode.

FIG. 9 shows the whole state of the operation status table window 70*a*, different from FIGS. 8(*a*2), 8(*b*2) and 8(*c*2) showing them partially. The No. 18 cart advancing toward the 3H green G is flashed or displayed in a different color while the No. 24 cart advancing toward the 2H fairway F is flashed or displayed in a different color.

The jammed state of each hole is one of items to be always grasped consciously by the manager. The method of changing the display mode when a cart leaves a communication area is very useful because the current state can be accurately grasped. In addition, it is unnecessary to increase the number of display columns on the display screen of a personal computer. The number of display columns and the size of each display column in the conventional method can be applicable to that method without any change.

FIG. 10 illustrates a play operation status table window 30A. On this window 30A, carts distributed on the whole course, explained with reference to FIG. 4, are shown as bar graphs for each course. Each hole consists of tee ground, fairway and green. Carts on tee ground, fairway or green are represented as a cart mark 35 above a bar graph.

In order to display carts during moving to the next spot on the window 30A, the corresponding cart mark is flashed or displaced in a different color. In an example of displaying a cart during moving, when a cart is moving toward a fairway after a tee shot on the 4H tee ground, the cart mark 35*a* on the fairway 4HF of No. 4 hole is flashed or displayed in a different color. If a slow playing group (e.g. the cart mark 35*b* on 8HT) playing over a standard time period for each hole is displayed in red, the status during playing is displayed in a different color.

On the window 30A, numeral 36*a* represents the number of carts on the tee ground T, fairway F or green G. Numeral 36*b* represents the number of carts on a hole. When numeral 36*a* is clicked and indicated with, for example, a mouse, the corresponding cart number is represented on the window.

Figure 11:
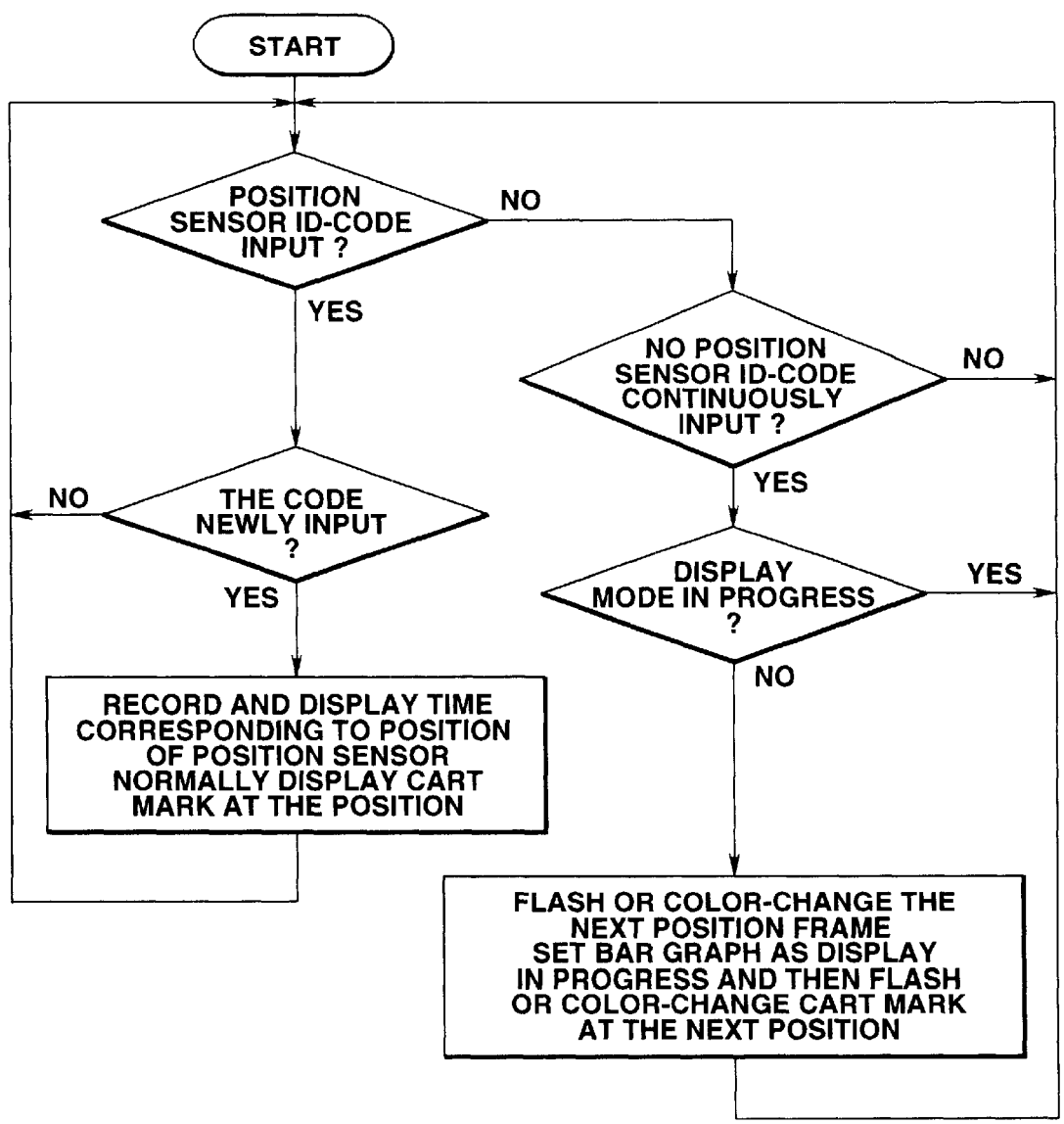
FIG. 11 is a flowchart for selectively displaying a cart moving to the next spot.
Figure 14:
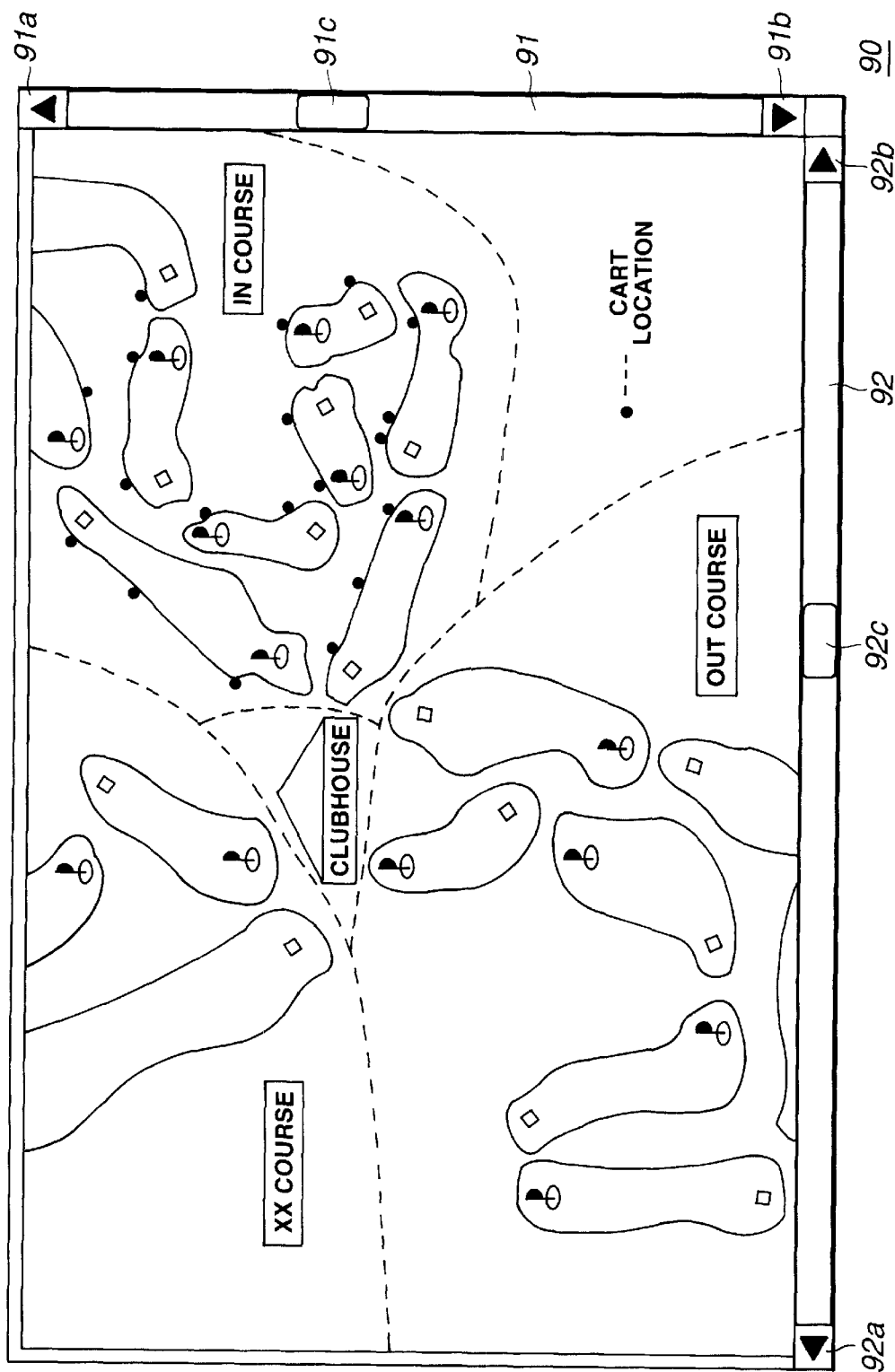
FIG. 14 is a diagram explaining the display mode of a conventional operation status which represents the topography of each course and displays current cart locations.
Figure 15:
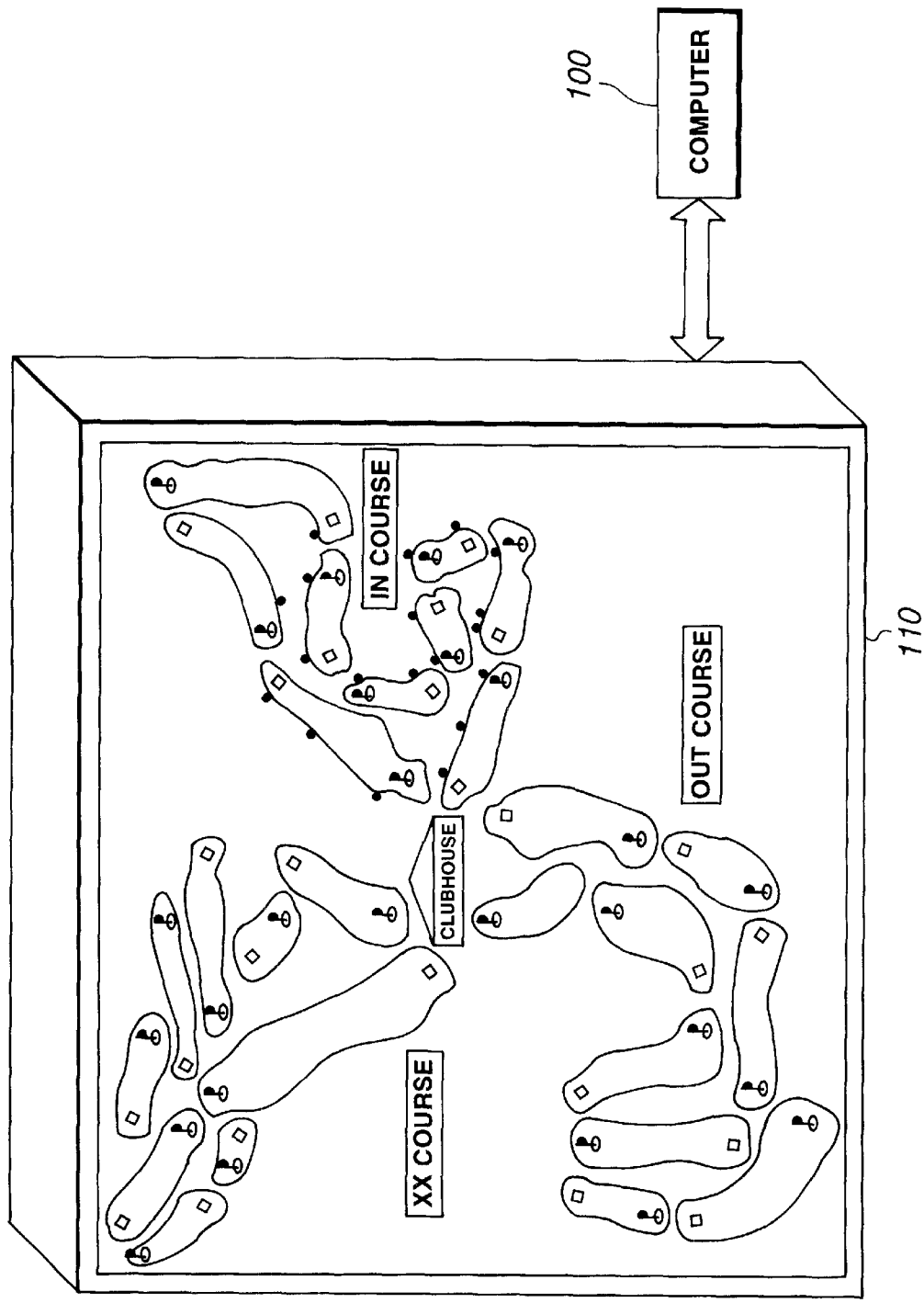
FIG. 15 is a diagram explaining the display mode of a conventional operation status table displayed on a large display device in the display mode shown in FIG. 14.

The operation status table creating means is within the control unit 12 of the operation management section 1 shown in FIGS. 2 and 3. The operation status table creating means judges and implements the series of operations according to the logic shown the flowchart shown in FIG. 11. If the position sensor ID is not continuously received for a fixed period, it is judged that the cart is moving toward the next spot (location) from the location displayed just before. Then, the display column of the next spot is flashed or displayed in a different color.

Distinctively displaying a cart moving toward the next spot and a cart engaged in playing is not limited only to the above-mentioned two examples. This display method can be effectively utilized to the operation status table (FIG. 6) for each cart and the modified embodiment shown in FIG. 7.

As described above, the present invention can schematically display the operation status of each golf cart as predetermined character/graphic information based on information about the location of a detected golf cart. The operation status can be visually grasped with a small volume of information, compared with the time display of play histories. This feature allows an actual display area to be reduced so that all the operation statuses can be substantially displayed on the same screen.

Moreover, according to the present invention, the sensor means can obtain the location information of golf carts. This operation is not adversely affected by the layout of the golf course, thus easily displaying the operation status. The present invention is applicable to various kinds of golf courses and does not require setting differently to each golf course. Hence, the golf manager can introduce this system in a short time and at low costs. The system producer requires no step of customizing the system for each gold course, so that the manufacturing costs can be advantageously suppressed.

With cart marks flashing in bar graphs or changing colors thereof, a cart in movement to the next spot can be distinguished from a cart depending on a golfer in a play. Thus, the play crowded state can be grasped based on the actual circumstances. This distinctive displaying method is applicable to the operation status table for each cart and a prior art operation status table window with the function of displaying an arrival time to each spot, without increasing the number of display frames.

Furthermore, plural pieces of information can be displayed on the same screen in a superimposing mode by changing a cart mark or flashing the display color thereof. When the cart mark of which the standard play time exceeds is displayed, for example, in red, different from the cart mark in a moving state, the slow playing group causing the jammed state, or one of concerns of the golf ground manager, can be accurately recognized.

What is claimed is:

1. A golf cart control and monitoring system on a golf course, comprising:

a plurality of sensors arranged along a golf cart path at locations corresponding to at least a teeing ground, a fairway, and a putting green of each hole of the golf course, each of said sensors including a sensor ID transmitting apparatus;

each of a plurality of golf carts travelling on said golf cart path include a golf cart ID transmitting apparatus configured to maintain communication between said sensors and said golf carts; and a golf cart control station having a golf cart location device configured to determine locations of the golf carts travelling on the golf cart path, wherein said golf cart location device includes:

(a) a radio transmitter/receiver configured to receive information on the golf cart IDs and a current location of said golf carts in the golf course from said sensors and said golf carts;

(b) a signal processing unit configured to process information on the golf cart IDs and the current location of said golf carts and to provide a table including location information corresponding to the current location of each golf cart on the teeing ground, the fairway and the putting green of each hole of the entire golf course, said location information being displayed in a sequentially straight line and being variable information which progressively changes as the golf carts pass the sensors arranged at the teeing ground. the fairway and the putting green; and (c) a display configured to indicate a progress of the golf carts on the table as the golf carts travel around the golf course.

2. A golf cart control and monitoring system on a golf course, comprising:

a plurality of sensors arranged along a golf cart path at locations corresponding to at least a teeing ground, a fairway, and a putting green of each hole of the golf course, each of said sensors including a sensor ID transmitting apparatus;

each of a plurality of golf carts travelling on said golf cart path include a golf cart ID transmitting apparatus configured to maintain communication between said sensors and said golf carts; and a golf cart control station having a golf cart location device configured to determine locations of the golf carts travelling on the golf cart path, wherein said golf cart location display device includes:

(a) a radio transmitter/receiver configured to receive information on said golf cart IDs and a current location of said golf carts in the golf course from said sensors and said golf carts;

(b) a signal processing unit configured to process information on the golf cart IDs and the current location of said golf carts and to provide a table including location information corresponding to the current location of each golf cart represented by a respective golf cart ID on the teeing ground, the fairway and the putting green of each hole of the entire golf course, said location information being displayed by a bar graph and being variable information which progressively changes as the golf carts pass the sensors arranged at the teeing ground, the fairway and the putting green; and (c) a display configured to indicate the successive progress of the golf carts from a starting hole to the current location on said table by the bar graph as the golf carts travel around said golf course.

3. The golf cart control and monitoring system according to claim 2, wherein said display indicates the successive progress of each golf cart from the starting hole to the current location of the golf course by the bar graph together with a lapse of time.

4. A golf cart control and monitoring system on a golf course, comprising:

a plurality of sensor arranged along a golf cart path at locations corresponding to at least a teeing ground, a fairway, and a putting green of each hole of the golf course, each of said sensors including a sensor ID transmitting apparatus;

each of a plurality of golf carts traveling on said golf cart path include a golf cart ID transmitting apparatus configured to maintain communication between said sensors and said golf carts; and a golf cart control station having a golf cart location device configured to determine locations of the golf carts travelling on the golf cart path, wherein said golf cart location display device includes:

(a) a radio transmitter/receiver configured to receive information on the golf cart IDs and a current location of the golf carts in the golf course from said sensors and said golf carts;

(b) a signal processing unit configured to process information on said golf cart IDs and the current location of said golf cart, to provide a table including location formation corresponding to the current location of each golf cart on the teeing ground, the fairway and the putting green of each hole of the entire golf course, said location information being displayed in a sequentially straight line, and to alter a display characteristic of a succeeding entry of the table corresponding to where said carts are going to proceed next, when the radio transmitter/receiver does not receive information on the golf cart IDs and the current location of the golf carts for a predetermined period of time; and (c) a display configured to indicate a progress of the golf carts on the table as the golf carts travel around the golf course.

5. A golf cart control and monitoring system on a golf course, comprising:

a plurality of sensors arranged along a golf cart path at locations corresponding to at least a teeing ground, a fairway, and a putting green of each hole of the golf course, each of said sensors including a sensor ID transmitting apparatus;

each of a plurality of golf carts travelling on said golf cart path include a golf cart ID transmitting apparatus configured to maintain communication between said sensors and said golf carts; and a golf cart control station having a golf cart location device configured to determine locations of the golf carts travelling on the golf cart path, wherein said golf cart location display device includes:

(a) a radio transmitter/receiver configured to receive information on said golf cart IDs and a current location of said golf carts in the golf course from said sensors and said golf carts;

(b) a signal processing unit configured to process information on the golf cart IDs and the current location of the golf carts, to provide a table including location information corresponding to the current location of each golf cart represented by a respective golf cart ID on the teeing ground, the fairway and the putting green of each hole of the entire golf course, said location information being displayed by a bar graph, and to alter a display characteristic in display areas corresponding to where said carts are going to proceed next, when the radio transmitter/receiver does not receive information on the golf cart IDs and the current location of the golf carts for a predetermined period of time; and (c) a display configured to indicate the progress of the golf carts on the table as the golf carts travel around the golf course.

6. The golf cart control and monitoring system according to claim 4, wherein the signal processing unit alters the display characteristic by one of flashing and changing a color of the succeeding entry of the table.

7. The golf cart control and monitoring system according to claim 5, wherein the signal processing unit alters the display characteristic by one of flashing and changing a color of the succeeding entry of the table.

* * * * *